United States Patent Office 3,479,322
Patented Nov. 18, 1969

3,479,322
CATIONIC ION EXCHANGE RESIN CATALYSTS
AND PROCESS FOR THEIR PRODUCTION AND
USE
Alan H. Peterson, Littleton, Colo., assignor to Marathon
Oil Company, Findley, Ohio, a corporation of Ohio
No Drawing. Filed Feb. 14, 1966, Ser. No. 527,053
Int. Cl. C08g 7/00; C07c 3/54; B01j 11/82
U.S. Cl. 260—67
14 Claims

ABSTRACT OF THE DISCLOSURE

The present invention comprises in chemical processes conventionally utilizing mild Friedel-Crafts catalysts, the improvement of substituting for conventional mild Friedel-Crafts catalysts a catalytic amount of a cationic ion exchange resin in which the cation present is selected from cations having valences of at least 2.

The present invention relates to new catalysts and especially to catalysts comprising cationic ion exchange resins in which the cation has a valence of at least 2.

The present invention comprises cationic ion exchange resins (preferably sulfonic acid ion exchange resins and most preferably those having a macroreticular structure) in which all or a portion of the accessible hydrogen ion has been exchanged by a metal ion having a valence of 2 or more.

According to the present invention, it has been discovered that these metal-substituted cationic ion exchange resins act as particularly mild catalysts of the Friedel-Crafts type. The mildness of their activity is especially useful in the control of reactions where excessive catalytic activity causes undesirable degradation or over-substitution, e.g., in the alkylation of activated aromatic nuclei with alkyl halides. As shown in the examples which follow, the catalysts of the present invention are especially valuable in the preparation of light-colored, aromatic-containing resins.

The preferred reactions for use in conjunction with the catalysts of the present invention are alkylations of aromatic nuclei which are electron rich by virtue of their being substituted with at least one strongly ortho,para-directing group, by reaction with an alkylating compound selected from the group consisting of alkyl halides, preferably 1–20 and most preferably 2 to about 12 carbon atom alkyl chlorides; alcohols, preferably those having from 1 to about 20 and most preferably those having from 2 to about 12 carbon atoms; and olefins, preferably those having from 3 to about 20 carbon atoms. Other preferred reactions (also included for convenience within the term alkylation) for the use of the catalysts of the present invention are alkylation of aromatic compounds or their substituted derivatives having ortho-para-directing substituents with aldehydes preferably containing from 1 to about 3 carbon atoms to form diarylmethanes or 1,1-diarylalkanes or resinous products having this type of structure. Preferred aromatic compounds for this reaction include tri-, tetra- and pentaalkylbenzenes particularly tri-, tetra-, and pentamethylbenzenes, naphthalene, alkyl naphthalenes having at least one unsubstituted nuclear carbon atom, and other aromatic compounds of comparable reactivity with aldehydes. Benzene and toluene and other mono alkyl benzenes together with compounds not having an unsubstituted nuclear carbon are unreactive under the preferred reaction conditions and may be used as reaction solvents.

The catalysts of the present invention are formed simply by exchanging protons of a suitable cationic ion exchange resin such as a sulfonic acid ion exchange resin, e.g., Amberlyst 15 with metal halides dissolved in a solvent. The preferred metal halides are those having valences of 2 or more especially $Sn^{+4}$, $Al^{+3}$, $Ti^{+4}$, $Fe^{+3}$, $Zr^{+4}$ and most preferred, $Zn^{+2}$.

The di- or polyvalent metal form of the sulfonic acid resin may be prepared either in situ or prior to the reaction. The latter case is preferred if the catalyst is to be used in a fixed bed operation. In this case, the exchange reaction is carried out by any of the procedures known to the art. In general, the resin, either in sulfonic acid (preferred) or in monovalent salt form, is contacted with an aqueous solution of the di- or polyvalent metal as, for example, the chloride or sulfate either in a column or by simply stirring together in a vessel. The concentration of the di- or polyvalent metal cation in the aqueous solution is not narrowly critical provided the total quantity of di- or polyvalent metal cation is sufficient to exchange the major portion of the exchangeable protons (or monovalent cations).

Alternatively, the sulfonic acid or monovalent salt form of the resin can be added to the reaction mixture together with the di- or polyvalent metal salt to form the di- or polyvalent metal form of the sulfonic acid resin in situ.

While in many instances, the catalysts of the present invention will preferably be virtually completely substituted with the metal, that is, virtually completely converted from the acid form to the metal salt form, there may be instances in which the acid form will desirably be only partially converted to the metal salt form.

In a preferred embodiment of the present invention a synthetic cationic exchange resin, Amberlyst 15 manufactured by Rohm & Haas of Philadelphia is treated with approximately 100% of the theoretically required $ZnCl_2$ (assuming $Zn^{++}=2H^{+}$) dissolved in about 100 moles of water per mole of $ZnCl_2$. The contact is maintained for 10 minutes (in most instances contact times from 1 to 60 minutes and more preferably from 5 to 20 minutes are preferred), and the catalyst is then dried for 24 hours at 105° C. and 20 mm. Hg.

The resulting catalyst (8 g.) is then used to catalyze the reaction between light catalytic cycle oil aromatic extract (32 ml.), containing a variety of alkyl aromatics consisting largely of methyl, dimethyl and trimethyl naphthalenes; and paraformaldehyde (6 g.) with toluene (50 ml.) as solvent. The resulting resinous product which forms within about 4 hours at reflux is light yellow in color indicating that color producing side reactions have been reduced nearly to a minimum.

Among the specific preferred reactions of the present invention are the alkylation of highly active electron rich aromatic nuclei containing strongly ortho,para-directing electron-donating groups such as:

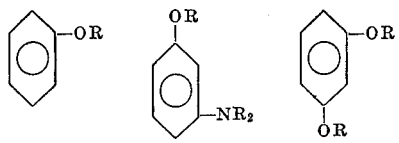

wherein R is either H or alkyl, preferably having from 1 to about 25 carbon atoms; with an alkyl halide, preferably having from 1 to about 25 carbon atoms; or with an alcohol also preferably having 1 to about 25 carbon atoms; or with an olefin preferably having from 3 to about 20 carbon atoms.

As used herein, "aromatic" includes benzene, alkylbenzenes, naphthalene, alkylnaphthalenes, polycyclic aromatics such as anthracene, partially saturated polycyclic aromatics such as 9,10-dihydroanthracene and alkyl derivatives thereof, and heterocyclic aromatic compounds containing not more than one heteroatom selected from nitrogen, sulfur and oxygen and especially furan and alkyl furans.

The exact quantities of the catalysts of the present invention to be utilized for any given set of reactions and conditions can be readily determined by making trial runs. However, in general, the use of from 1 to about 100, more preferably from 10 to about 50, and most preferably from 20 to about 40 grams of catalyst per mole of aromatic compound will be preferred.

The conditions under which the various reactions which advantageously use the catalysts of the present invention are carried out will, in general, be the conventional conditions utilized with such reactions.

It should be understood that the catalysts of the present invention are not limited in their use to those reactions which are enumerated specifically above. In general, the catalysts of the present invention are new mild Friedel-Crafts catalysts and are generally usable in most of those reactions which are catalyzable by such catalysts.

Of all the uses of the present catalysts, the most preferred application is the production of resins from aromatic compounds especially the reaction of such compounds with aldehydes, particularly those having from 1 to 3 carbon atoms. The color of the resinous product obtained by the use of the catalysts of the present invention is lighter than that which would be obtained if conventional Friedel-Crafts catalysts or conventional sulfonic acid ion exchange resins were employed as catalysts. This light color is a highly desirable characteristic in the finished resin.

The invention is further illustrated by the examples which follow. These examples are not to be considered as limiting the invention, and all of the apparent modifications and variations of the invention are to be taken as being included within the claims appended hereto.

EXAMPLE I 16.0 grams of a marcroreticular sulfonic acid cationic exchange resin, Amberlyst 15 manufactured by Rohm & Haas, is placed in a glass container and treated with 4.01 grams (75% of the theoretical stoichiometric equivalent of the ion exchange resin) of $ZnCl_2$ in 75 ml. of water. The exchange is carried on for 30 minutes at a temperature of 25° C.

The catalyst is then dried for 24 hours at 105° C. and 20 mm. Hg.

The above procedure is repeated using another portion of the same Amberlyst 15 with 200% of the theoretically required $ZnCl_2$ in the same amount of water.

EXAMPLE II

Four simultaneous experiments are run using 32 ml. of light catalytic cycle oil aromatic extract, a conventionally produced petroleum refinery stream containing approximately:

| | Wt. percent |
|---|---|
| Paraffins | 0.2 |
| Noncondensed cycloparaffins | 1.3 |
| Condensed cycloparaffins | 1.2 |
| Alkyl benzenes | 3.8 |
| Indans+Tetralins | 9.0 |
| Alkyl naphthalenes | 47.7 |
| Acenaphthenes and biphenyls | 24.0 |
| Fluorenes | 11.4 |
| Benzothiophenes | 1.4 | with 6.0 paraformaldehyde and 50 ml. toluene as solvent in each reaction mixture. To each of the reaction mixtures is added 8.0 g. of catalyst. The catalysts are the Amberlyst (75% $Zn^{++}$) and Amberlyst (200% $Zn^{++}$) prepared in Example I together with the acid forms of Amberlyst 15 and of Dowex 50–X4, an ion exchange resin produced by the Dow Chemical Company of Midland, Michigan.

The reaction mixtures are stirred at reflux for 3¼ hours. After this time they are cooled to room temperature, each reaction mixture is diluted with 100 ml. toluene, and the product solution is decanted from the catalyst. The product solutions are washed once with water and then treated with two 5 g. portions of monotmorillonite K20M (a clay type adsorbent manufactured by Chemetron Corporation of Louisville, Ky.), in order to dry and partially decolorize the product. Toluene and unreacted oils are then removed by distillation to a pot temperature of 222° C. at 0.1 mm. Hg. The resulting resins are poured from the flasks while hot and allowed to cool in a thin sheet. Yields and color of the resin products are shown in Table 1.

TABLE 1

| Catalyst | Resin yield, G. | Resin color | Molecular weight |
|---|---|---|---|
| Amberlyst 15 (H+ form) | 17.03 | Dark amber | 400.6 |
| Amberlyst 15 (75% Zn++) | 15.17 | Light amber | 387.3 |
| Amberlyst 15 (200% Zn++) | 12.21 | Light yellow | 397.2 |
| Dowex 50-X4 | 2.06 | Dark brown | |

EXAMPLE III

A reaction mixture consisting of phenol (0.1 mole), benzene (100 ml.) and 2.0 g. of catalyst prepared as in Example 1 using 200% of the theoretical quantity of $ZnCl_2$ is stirred at 70° C. while 0.1 mole of n-butylchloride is added dropwise over a period of 30 minutes. The reaction mixture is held at 70° C. for an additional 1 hour and then cooled slightly and decanted from the catalyst. The product is distilled to give a 30% yield of isomeric butyl phenols boiling from 230–250° C.

EXAMPLE IV

A reaction mixture consisting of phenol (1.0 mole), and 20 g. of catalyst prepared as in Example I using 200% of the theoretical quantity of $ZnCl_2$ and 1.0 mole of propylene primer is stirred at reflux (about 175° C.) for 5 hours. The yield of nonyl phenol is 60% based on phenol consumed.

EXAMPLE V

To illustrate formation of the catalyst in situ, a reaction is run using identical quantities and conditions to those used in Example IV except that instead of using the prepared zinc form of the catalyst, 16 g. of the sulfonic acid form of Amberlyst 15 and 5.33 g. of $ZnCl_2$ (approximately 100% of the theoretically required $ZnCl_2$) is used. The yield of nonylphenol is essentially the same as that obtained in Example IV and the recovered Amberlyst 15 is found to be essentially completely in the $Zn^{++}$ form.

What is claimed is:

1. In alkylation reaction processes conventionally utilizing Friedel-Crafts catalysts, the improvement of substituting for conventional Friedel-Crafts catalysts a catalytic amount of a sulfonic acid ion exchange resin in which the cation present is selected from cations having valences of at least 2.

2. The process of claim 1 in which the cationic ion exchange resin is a macroreticular sulfonic acid ion exchange resin.

3. The process of claim 2 in which the cation is selected from the group consisting of cations having valences of from 2 to 4, inclusive.

4. The process of claim 3 in which the cation is zinc.

5. The process of claim 2 in which the chemical process is the alkylation of aromatic nuclei which contain at least one strongly ortho,para-directing group by reaction with an alkylating compound selected from alkyl halides, olefins, and alcohols.

6. The process of claim 5 in which the chemical process is the alkylation of an aromatic nucleus containing strongly ortho,para-directing groups and in which the ortho,para-directing groups are selected from the class consisting of —OR and —$NR_2$ wherein R is either H or alkyl.

7. The process of claim 6 wherein R is a 1 to 20 carbon atom alkyl hydrocarbon group.

8. The process of claim 6 in which R is hydrogen.

9. The process of claim 5 in which the chemical process is the reaction of an aromatic compound with an aldehyde having from 1 to 3 carbon atoms, inclusive.

10. The process of claim 9 in which the aromatic compound is a polymethyl benzene or benzene substituted with at least one strongly ortho,para-directing group selected from the class consisting of —OR and —NR$_2$ where R is either H or alkyl.

11. The process of claim 10 in which the aldehyde is formaldehyde.

12. The process of claim 9 in which the aromatic compound is naphthalene or naphthalene substituted with alkyl or stronger ortho,para-directing substituents.

13. The process of claim 9 in which the aromatic component is a mixture of aromatic compounds such as are found in petroleum refinery streams such as catalytic cycle oils or heavy reformates.

14. The process of claim 2 in which the chemical process is the reaction of reactive aromatic compounds or their substituted derivatives having ortho,para-directing substituents with aldehydes containing from 1 to about 3 carbon atoms.

References Cited

UNITED STATES PATENTS

| | | |
|---|---|---|
| 2,322,870 | 6/1943 | Molinari. |
| 3,000,859 | 9/1961 | Mirviss et al. |
| 3,017,441 | 1/1962 | Thomas et al. _____ 260—671 |
| 3,178,393 | 4/1965 | Brandt et al. |

OTHER REFERENCES

Calmon et al. Ion Exchangers In Organic and Biochemistry, Interscience Pub., Inc., N.Y. (1957), p. 408.

Kressman et al., Journal Chemical Society (London), 1949, pp. 1201–1208.

Kunin, Ion Exchange Resins, John Wiley & Sons, Inc., N.Y., 2nd ed., 1958, pp. 201–203 and 450–51.

HAROLD D. ANDERSON, Primary Examiner

L. M. PHYNES, Assistant Examiner

U.S. Cl. X.R.

260—2.2, 624, 671

IN THE UNITED STATES PATENT OFFICE

CERTIFICATE OF CORRECTION

Patent No. 3,479,322　　　　　　　　　　　　Dated Nov. 18, 1969

A. H. Peterson

It is certified that error appears in the above-identified patent and that said Letters Patent are hereby corrected as shown below:

In the patent, Col. 3, line 36 -- "marco" should read --macro--

Col. 4, line 2　 -- "monotmor" should read --montmc

Col. 4, line 35 -- "primer" should read --trimer--

SIGNED AND
SEALED
JUN 2 1970

(SEAL)
Attest:

Edward M. Fletcher, Jr.
Attesting Officer

WILLIAM E. SCHUYLER, JR.
Commissioner of Patents